United States Patent

[11] 3,585,472

[72] Inventors John E. Dornfeld
Mequon;
Sidney B. Williams, Cedarburg; George A. Mantey, Grafton, all of, Wis.

[21] Appl. No. 2,587

[22] Filed Jan. 13, 1970

[45] Patented June 15, 1971

[73] Assignee Sprague Electric Company
North Adams, Mass.

[54] COATED ELECTRICAL COMPONENT AND METHOD OF MANUFACTURING
8 Claims, 3 Drawing Figs.

[52] U.S. Cl. .......... 317/261, 317/242, 29/25.42

[51] Int. Cl. .......... H01g 3/06

[50] Field of Search .......... 317/242, 261; 29/25.42

[56] References Cited

UNITED STATES PATENTS

| | | | |
|---|---|---|---|
| 3,047,782 | 7/1962 | McCarthy .......... | 317/242 X |
| 3,111,612 | 11/1963 | Lehmann .......... | 317/242 |

*Primary Examiner*—E. A. Goldberg
*Attorneys*—Connolly and Hutz, Vincent H. Sweeney, James Paul O'Sullivan and Donald R. Thornton

ABSTRACT: The component has a first insulative coating forming a perimetric margin on both planar surfaces, leads are extended over the margin at an edge of the component, and a second insulative coating is disposed over the component and terminated on the margin portion under the leads such that the extended leads are noncoated.

In the method, a planar component is first predipped to provide a perimetric margin, leads are then applied to the component and extended over the margin, and the unit then coated up to margin portions adjacent the leads.

PATENTED JUN 15 1971 3,585,472

COATED ELECTRICAL COMPONENT AND METHOD OF MANUFACTURING

BACKGROUND OF THE INVENTION

This invention relates to coated electrical components and more particularly to planar electrical components having radially extending noncoated leads and to a method of manufacturing the same.

In the manufacturing of insulatively coated electrical components such as disc capacitors or the like, it is desirable to provide clean, uncontaminated leads, that is, leads which have never been coated with insulative material. In the prior art, this has been accomplished by first coating an edge portion of the disc with coating material. Then, mounting the component leads such that they pass over the precoated portion where they extend from the capacitor, and finally coating the unit up to the precoated portion. This provides noncoated extended leads; however, it results in a nonsymmetrical unit during manufacturing, which requires orientation for lead mounting. This, of course, is extremely costly for symmetrical body units produced by automated equipment.

SUMMARY OF THE INVENTION

It is an object of this invention to provide a coated electrical component having noncoated extended leads.

It is another object of this invention to provide a coated capacitor having noncoated radially extended leads.

It is a further object of this invention to provide a coated component having symmetrical precoated margins which eliminate the necessity of unit orientation for mounting of the leads.

It is a still further object of this invention to provide a method of making a coated electrical component with noncoated extended leads.

Broadly, an electrical component provided in accordance with the invention comprises a component having a first insulative coating providing a perimetric margin enclosing an area of a planar surface of the component, a terminal lead extends over the margin at one edge of the unit and a second insulative coating is disposed on this surface and terminated within the margin at the one edge such that lead portions extending from the unit are noncoated.

In the method of the invention, perimetric portions of an electrical component are first precoated with insulative material. Then at least one lead is attached to the component and extended therefrom over the margin. Finally, the component is coated with insulative material up to a margin portion adjacent the lead.

DESCRIPTION OF THE PREFERRED EMBODIMENTS

Figure 1:
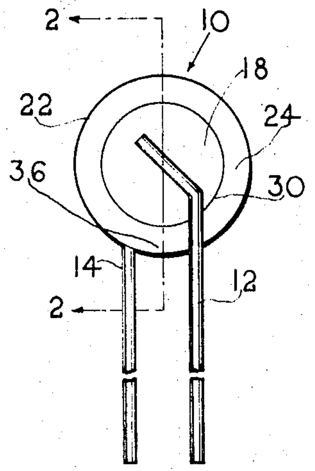
FIG. 1 is a plan view of an electrical component with a margin edge coating.
Figure 2:
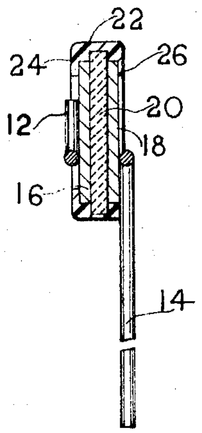
FIG. 2 is a view in section taken along the line 2–2 of FIG. 1.

In FIGS. 1 and 2 an electrical component 10, for example a ceramic disc capacitor or the like is shown having extended lead-wire terminals 12 and 14 in connection to electrodes 16 and 18, respectively which are centrally located on opposed planar faces of dielectric disc 20. An insulative coating 22 circumferentially encompasses the edge of disc 20 and provides perimetric margins 24 and 26 respectively on its planar faces.

Figure 3:
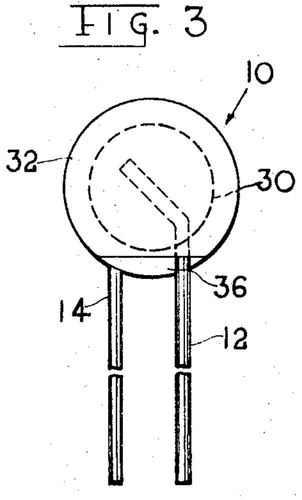
FIG. 3 is a plan view of the completed unit showing its outer insulative coating.

Margins 24, 26 make the unit fully symmetrical. Hence, the leads may be applied without rotational orientation of the disc and the unit then dip coated to the margin portion adjacent the leads so as to completely coat the unit body as shown in FIG. 3, without coating extended lead portions. Stated otherwise, the perimetrical margins insures that any edge chosen as the lead emergence edge will have a predip coating.

The unit is constructed by first forming a disc 20 of suitable dielectric material, such as barium titanate or the like. Thereafter conductive electrodes 16 and 18, of silver or the like, are formed or deposited on the opposed planar surfaces. A first coating 22 of insulative material such as a phenolic resin or the like, for example a highly mineral filled phenolic conformal coating sold under the trade name Durez by the Durez Plastics and Chemicals, Inc. is then deposited on the unit to seal the edges of disc 20 and provide surface margins 24 and 26.

Coating 22 may be applied by many different techniques. For example, when a circular component body or disc is employed, the unit may be rolled on edge in a trough filled with liquid coating to a depth equal to the width of margin desired. Preferably, however, the unit is first coated on one face and then the other. For example, the unit may be pressed face down on a perforated plate (not shown) which is covered with the desired coating. The perforation diameter is made substantially equal to the inner diameter of the margin, and sufficient coating is provided on the perforated plate so as to also deposit coating on the disc edges. In practice, a large number of discs are held horizontally side by side by a vacuum pick up device or the like, and a perforated plate is immersed in the coating material and then raised so as to permit the perimeter of the perforation to concentrically contact the discs. The plate is then lowered leaving a donut-shaped deposit on the disc face and edge. This is allowed to dry to facilitate handling, and the disc is then turned over and the coating application repeated on the second side. The coating may then be cured in a conventional manner, for example, by heating to approximately 150° C.

The predip or margin forming coating may also be applied by rotating the disc with outer portions engaging the coating liquid. In this case, the coating may be held in an overflowing container or directed in a vertical stream etc. Of course, except for the rolling application, the described predip methods are also applicable to noncylindrical disc, for example, to square or rectangular components.

Leads 12 and 14 of tinned copper or the like are then mounted on respective sides of the unit in connection to the exposed electrode area enclosed within the donut coating. The unit is then held by the leads and dipped in insulative coating such as a phenolic to coat the unit up to the margin underlying or adjacent leads 12, 14. This provides an outer coating 32 which terminates (at line 34) on margin portion 36 and in cooperation with it, completely encloses capacitor 10 and its connected lead portions without coating lead portions extended from the perimeter of the unit. The overall coating may then be cured in a conventional manner.

In the preferred embodiment, the extended lead portions are clean or that is, noncoated at any point beyond the edge of body. However, depending on the dip tolerance, disc diameter and lead spacing the leads may be coated up to the line tangent to the body edge equidistant between the leads. That is because of dip control tolerance and body component size etc. the outer coat may in some cases extend to the farthest edge or that is to the point on the perimeter whose tangent line is substantially perpendicular to leads 12 and 14. Hence, the outer coating is still terminated on the margin, and even though this does produce a minute length of coated leads, it is acceptable since the only remaining length (beyond the tangent line) of lead is employed in the conventional circuit board mounting or the like.

In a specific example, a ceramic disc capacitor having a 20 mil thick ½ inch diameter body of barium titanate was formed with 7/16 inch diameter silver electrodes deposited on its planar surfaces. The unit was circumferentially precoated with a phenolic resin by contacting first one side and then the other against a perforated plate coated with this resin. This operation coated the edges and provided a perimetric margin approximately three thirty-seconds inch in width which left an uncoated central area on each face of approximately five-sixteenths inch in diameter. Without orientation of the disc, tinned copper leads, one thirty-second inch in diameter and 2 inches long were soldered within the exposed area to respective electrodes and extended in substantially parallel relation from the disc. Finally, the unit was held by the leads and dipped in the phenolic coating up to margin portions underlying the leads. This provided a completely coated unit with noncoated extended leads.

Although thin flat components are preferred for practice of the invention, many differently shaped bodies may be suitably employed. In any case, however, the leads must extend from within the margin enclosed area and lie on or close to the margin where they radially emerge from the unit.

Many different coating materials can be employed. For example, epoxies, lacquers, polyurethanes or other prior art coatings are suitable. Additionally, multiple layer coatings such as a phenolic undercoat with an epoxy outer coat may also be employed. Of course, in this case, both the margin and the final coating would each be applied in a two step operation.

What I claim is:

1. A coated electrical component comprising a component having a substantially planar body, a first insulative coating disposed on at least one planar surface of said body and providing a perimetric margin enclosing an area of said one surface, a terminal lead in connection to said component and extended from within said area and over said margin at one edge of said body, a second insulative coating disposed on said surface area and lead portions thereat, said second coating extended to perimetrically contact said margin, and said second insulative coating terminated within the margin portion adjacent said one edge such that the lead portion extending from said body is noncoated.

2. The component of claim 1 wherein said first coating encloses the edges of said body and provides a second perimetric margin enclosing an area of the other major surface, a second terminal lead is in connection to said component and extended from the enclosed area of said second surface over said second margin at said one edge, and said second insulative coating is extended around said body and terminated on the margins adjacent said one edge such that lead portions extending therefrom are noncoated.

3. The component of claim 2 wherein said component is a substantially planar capacitor, said capacitor having an electrode disposed on both planar sides thereof, and said terminal leads are disposed on said electrodes respectively and extended in substantially spaced parallel relation from said capacitor.

4. The component of claim 3 wherein said capacitor is a cylindrical disc shaped capacitor, and said second coating is terminated on the margin portions disposed between said leads, and said leads are noncoated at least beyond a line tangent to said disc portion disposed between said leads.

5. A method of making an electrical component having noncoated leads comprising forming an electrical component having a substantially planar body, forming a margin of insulative coating around the perimeter of said body, attaching at least one lead to said component, extending said lead over said margin, forming a second coating over said component, and terminating said second coating within a margin portion adjacent said lead such that said lead is noncoated where it extends beyond said component.

6. The method of claim 5 including the step forming a similar margin on both planar surfaces of said body so as to perimetrically enclose the edge thereof, attaching a lead to each side of said component within the area enclosed by the margins, radially extending said leads in substantially close spacing from said component, and dipping said component in insulative coating material up to margin portions adjacent said body.

7. The method of claim 6 wherein said margins are applied by coating a perforated plate with said insulative material, positioning one planar surface of said component over said perforation, and perimetrically contacting a margin portion of said component to the surface of said plate surrounding said perforation to coat said margin portion, and repeating said steps to perimetrically coat the other planar surface of said component.

8. The method of claim 5 wherein said margin is applied by rotating said component with its marginal areas in contact with coating material.